Figure 1:
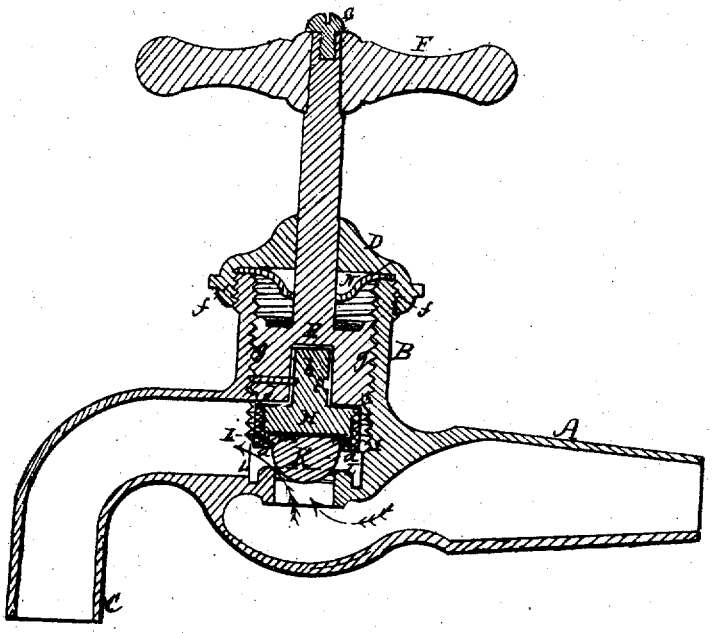
Figure 2:
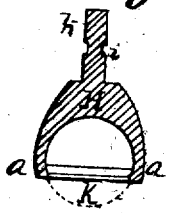

N. Jenkins.

Cock.

No. 1979. Reissued June 6. 1865.

Witnesses

N. Ames

C. Evans Jun

Inventor

Nathl Jenkins

UNITED STATES PATENT OFFICE.

NATHANIEL JENKINS, OF BOSTON, MASSACHUSETTS.

IMPROVEMENT IN COCKS.

Specification forming part of Letters Patent No. 47,309, dated April 18, 1865; Reissue No. 1,979, dated June 6, 1865.

*To all whom it may concern:*

Be it known that I, NATHANIEL JENKINS, of Boston, in the county of Suffolk and State of Massachusetts, have invented a new and useful Improvement in Cocks; and I do hereby declare that the following is a full, clear, and exact description of the construction and operation of the same, reference being had to the accompanying drawings, forming a part of this specification.

The nature of my invention consists, first, in attaching the elastic valve or packing K of a cock or faucet to the end of a plug or swivel, H, pivoted to the follower E, so that when the latter, being screwed downward, forces the said valve or packing onto its seat L the follower will turn on the swivel, and the valve or packing will have no axial motion, and consequently no rubbing, grinding friction on the seat, and will thus be rendered much more permanent and durable, and less power will be required to open and close the same than would be the case if it turned on its seat; second, in confining the elastic valve or packing K to the end of the swivel H by means of a removable cap or thimble, I, so as to be readily removed or replaced when required; third, in constructing the elastic valve or packing K of a faucet in a hemispherical or hemispheroidal shape, so as to readily conform both to the valve-seat L and the end of a follower or swivel, H, taking the place of a perfect sphere, at half the cost of the latter, and being much more easily kept in place; and, fourth, in constructing a hemispherical or hemispheroidal valve or packing, K, with a flange, *m*, around its base, by means of which it can be readily confined to a follower or swivel or removed therefrom, as hereinafter explained.

To enable others skilled in the art to make and use my improvement, I will now proceed to describe the construction and operation of the same.

A is the inlet, and C the outlet.

B is a cylindrical chamber for the reception of the follower and its appendages. The inside of this chamber is provided with an internal screw, *g*, to receive the external screw cut on the follower E, as shown in the drawings, which is a vertical longitudinal central section through the entire faucet.

D is the cap of the chamber B, to which it is confined by means of the internal and external screw *f*.

N is a circular diaphragm of leather or other suitable material, the periphery of which is pressed fast to the top of the chamber B by means of the cap D, the center of said diaphragm being provided with a round hole through which the stem of the follower E passes water-tight, thereby preventing any leakage from the top of the chamber. The general shape of the follower is clearly shown in the drawings, F being the handle, confined by means of the screw G in the usual manner.

H is the swivel, consisting of a cylindrical block of metal provided with a cylindrical shank, *h*, which enters and turns freely in a hole in the center of the follower, being prevented from dropping out of the latter by means of the pin *j*, which enters the annular groove *i* in the shank *h*.

I is a cap or thimble of any suitable metal, the bottom of which is provided with a flange, *a*. This thimble is confined to the swivel by means of an external and internal screw, as represented in the drawings; or it may be confined more cheaply by means of a single pin or screw passed through them both.

K is the valve or packing, of vulcanized rubber or other suitable elastic material, of a hemispherical or hemispheroidal shape, and having its base provided with a rim or flange, *m*, by means of which and the flange *a* of the thimble I it (the valve) is securely confined to the swivel H. The rim *m*, however, may in some cases be omitted, the compression of the elastic valve in a suitable socket (as that formed between the bottom of the swivel H and the side and flange of the thimble I) being sufficient to keep it in place. I prefer, however, as a general rule, to make use of the rim *m*.

The drawings represent the packing K and thimble I as applied to the end of the swivel H. It is obvious, however, that if desirable they may instead be applied to the end of the follower E itself, or to the followers in many other faucets now in general use.

The flange or rim *m* may also be applied to advantage to the elastic valves or packing of almost any known shape in general use as well as to those which I have described above and represented in the accompanying drawings.

It is also obvious that my swivel H may be used to advantage in connection with valves or packings of almost any description now in general use as well as with the valve K represented in the drawings.

Having thus described the construction and operation of my invention, what I claim as new, and desire to secure by Letters Patent, is—

1. The swivel H, in combination with the follower E and seat L, substantially as and for the purpose described.

2. The combination and arrangement of the thimble I, swivel H, and packing K, substantially as and for the purpose described.

3. The elastic packing or valve, attached to the follower by means of a flange, *m*, and a corresponding socket, substantially as set forth, and for the purpose described.

Witnesses: NATHL. JENKINS.
N. AMES,
W. A. ASHE.